United States Patent
Atkinson

(10) Patent No.: US 7,966,447 B2
(45) Date of Patent: Jun. 21, 2011

(54) SYSTEMS AND METHODS FOR DETERMINING REFRESH RATE OF MEMORY BASED ON RF ACTIVITIES

(75) Inventor: Lee Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 728 days.

(21) Appl. No.: 11/774,013

(22) Filed: Jul. 6, 2007

(65) Prior Publication Data

US 2009/0013127 A1    Jan. 8, 2009

(51) Int. Cl.
 *G06F 12/16* (2006.01)
 *H04B 17/00* (2006.01)

(52) U.S. Cl. . 711/106; 711/105; 711/104; 711/E12.103; 455/67.11

(58) Field of Classification Search .................. 711/106, 711/104, 105, E12.103; 455/67.11
See application file for complete search history.

(56) References Cited

U.S. PATENT DOCUMENTS

| | | | |
|---|---|---|---|
| 5,488,571 A | | 1/1996 | Jacobs et al. |
| 5,488,587 A | * | 1/1996 | Fukumoto ............... 365/222 |
| 5,950,224 A | * | 9/1999 | Devin .................. 711/106 |
| 6,126,327 A | | 10/2000 | Bi et al. |
| 2003/0198307 A1 | * | 10/2003 | Neill et al. .............. 375/346 |
| 2004/0153603 A1 | * | 8/2004 | Janzen ................. 711/106 |
| 2006/0184762 A1 | | 8/2006 | Cobley |

FOREIGN PATENT DOCUMENTS

JP    2003076953    * 3/2003

OTHER PUBLICATIONS

Search Report in Co-Pending and Co-Related PCT Application No. PCT/US2008/067575, dated Nov. 19, 2008.

* cited by examiner

*Primary Examiner* — Mardochee Chery

(57) ABSTRACT

Systems and methods for determining a refresh rate of volatile memory are provided. In this regard, a representative system, among others, includes a radio frequency (RF) device; a computing device that communicates with the RF device, the computing device including a refresh manager that monitors activities of the RF device; and volatile memory that communicates with the refresh manager of the computing device, wherein the refresh manager determines a refresh rate of the volatile memory based on the monitored activities of the RF device. A representative method, among others, for determining the refresh rate of volatile memory, includes monitoring activities of a radio frequency (RF) device; and adjusting a refresh rate of volatile memory based on the monitored activities of the RF device.

20 Claims, 4 Drawing Sheets

US 7,966,447 B2

SYSTEMS AND METHODS FOR DETERMINING REFRESH RATE OF MEMORY BASED ON RF ACTIVITIES

TECHNICAL FIELD

The present disclosure relates to volatile memory of a computer device, and more particularly, the disclosure relates to systems and methods for determining a refresh rate of volatile memory based on radio frequency (RF) activities.

BACKGROUND

Refreshing a volatile memory involves applying memory refresh signals to each storage element within that volatile memory. The volatile memory can use a capacitor to store one bit of data. If the capacitor is electrically charged, then that bit generally represents a logic "1." If the capacitor is not charged, then that bit generally represents a logic "0." The reason for refreshing the memory storage elements periodically is that electric charge slowly drains from the charged capacitors over time. If an uncharged capacitor (representing a logic "0") receives the refresh signal, then that capacitor stays uncharged. If a charged capacitor (representing a logic "1") receives the refresh signal before the capacitor completely discharges, however, that charged capacitor recharges to full capacity. Thus, the memory contents are maintained by refreshing each memory storage location often enough to ensure that the charged capacitors do not completely discharge. However, a local RF field can cause some noise during the read of the volatile memory, resulting in an unsuccessful read.

SUMMARY

Systems and methods for determining a refresh rate of volatile memory are provided. In this regard, a representative system, among others, includes a radio frequency (RF) device; a computing device that communicates with the RF device, the computing device including a refresh manager that monitors activities of the RF device; and volatile memory that communicates with the refresh manager of the computing device, wherein the refresh manager determines a refresh rate of the volatile memory based on the monitored activities of the RF device.

A representative method, among others, for determining the refresh rate of volatile memory, includes monitoring activities of a radio frequency (RF) device; and adjusting a refresh rate of volatile memory based on the monitored activities of the RF device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a refresh rate of volatile memory can be determined based on activities of a radio frequency (RF) device.

Figure 1:
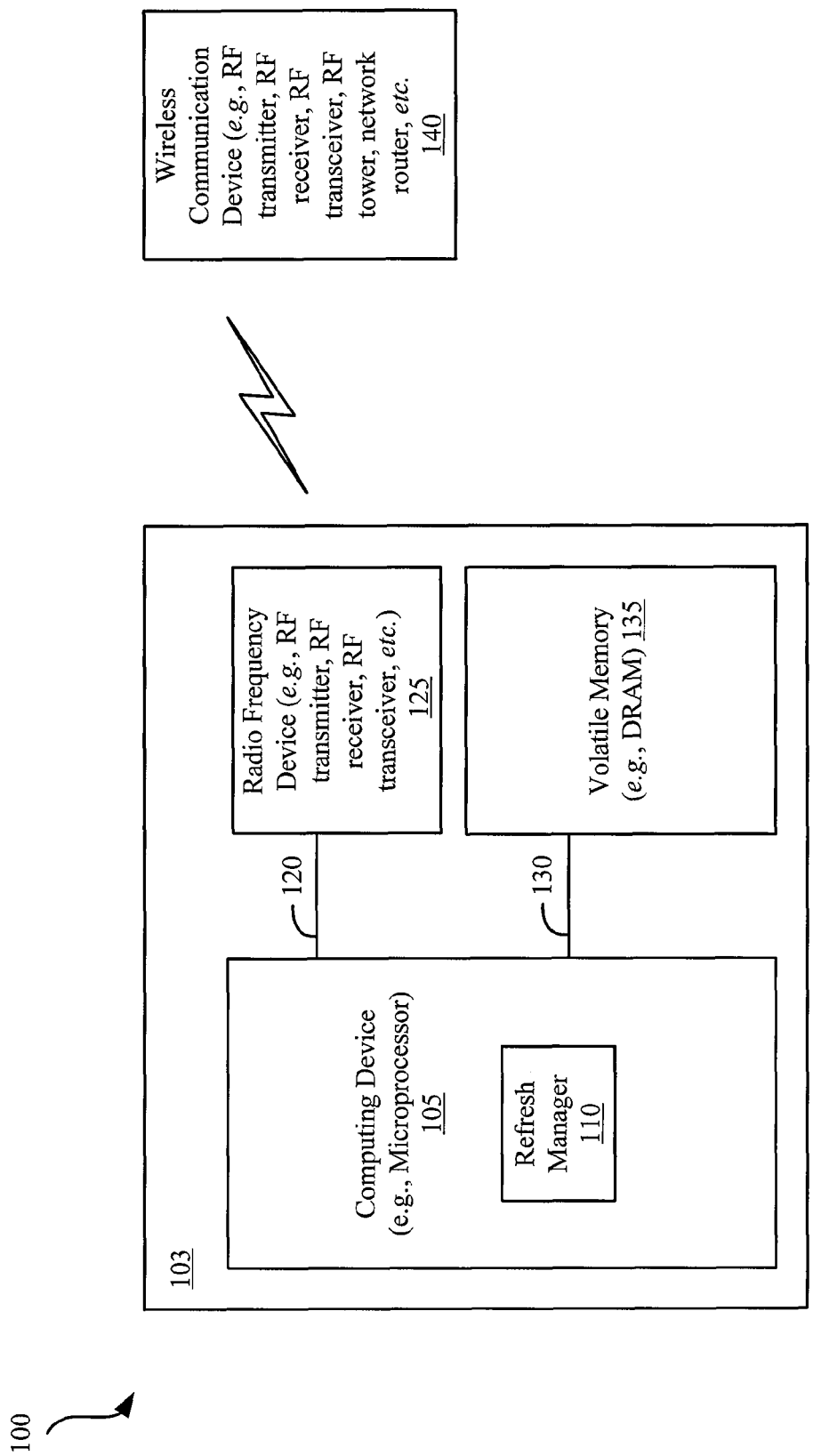
FIG. 1 is a system overview that determines a refresh rate of volatile memory associated with a computing device.

FIG. 1 is a system overview that determines the refresh rate of the volatile memory 135 associated with a computing device 105. The system 100 includes an electronic device 103 that includes the computing device 105, a radio frequency (RF) device 125 and the volatile memory 135. The RF device 125 and the volatile memory 135 are electrically coupled to the computing device 105 via lines 120, 130, respectively. The electronic device 103 communicates with a wireless communication device 140 via the radio frequency device 125. The electronic device can be, but not limited to, a camera, cell phone and computer, among others. The wireless communication device can be, but not limited to, an RF transmitter, RF receiver, RF transceiver, RF tower and a wireless network router, among others. Although the RF device 125 and the volatile memory 135 are shown to be separate components from the computing device 105, the RF device 125 and the volatile memory 135 can be integrated as part of the computing device 105, which is illustrated and further described in FIG. 2.

Figure 2:
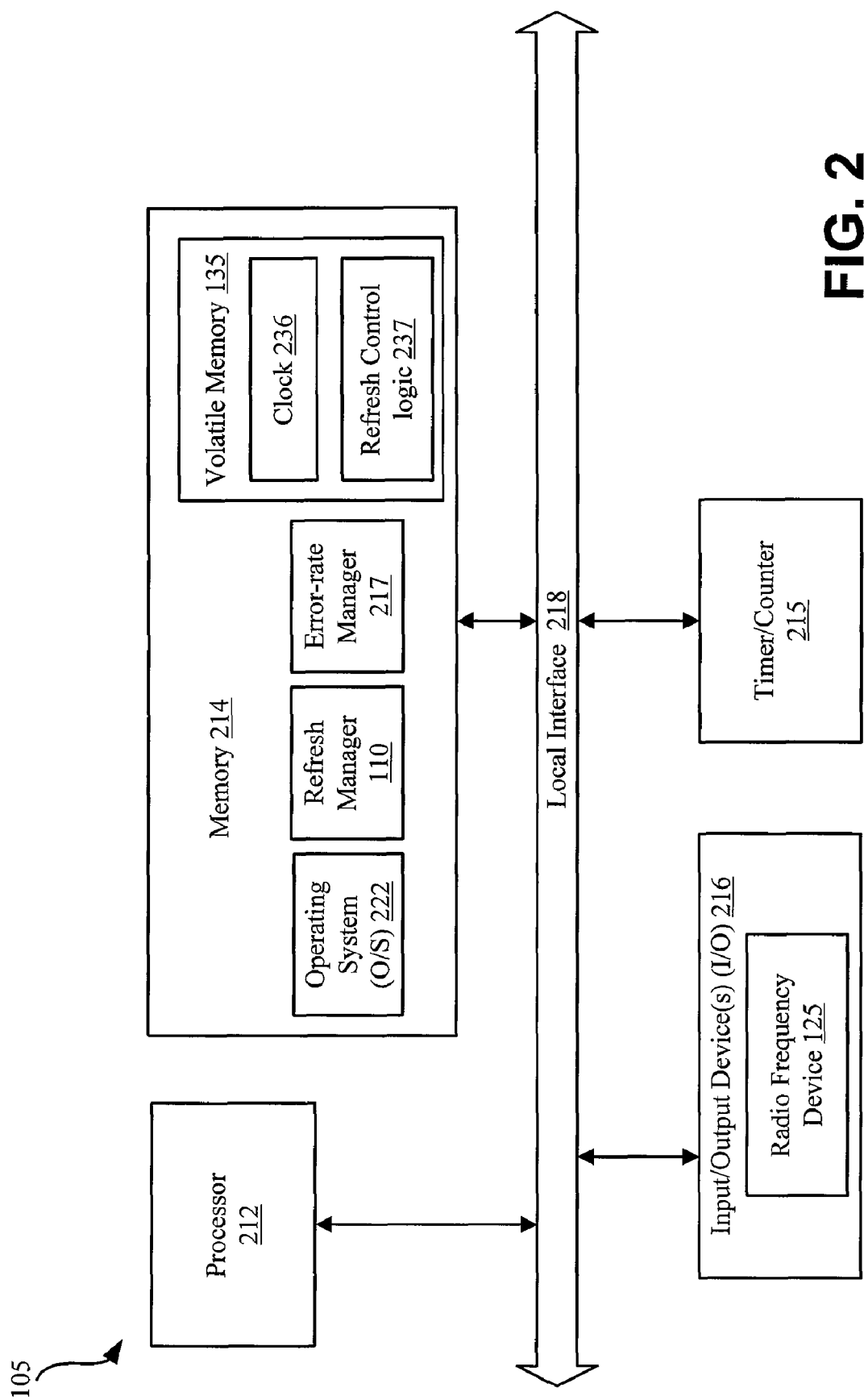
FIG. 2 is a block diagram that illustrates an embodiment of the computing device, such as that shown in FIG. 1, having a refresh manager.

The computing device 105 includes a refresh manager 110, which can be implemented in software (e.g., firmware), hardware, or a combination thereof. In one embodiment, the refresh manager 110 is implemented in software, as an executable program, and is executed by a special or general purpose digital computer, such as a personal computer (PC; IBM-compatible, Apple-compatible, or otherwise), workstation, minicomputer, or mainframe computer. An example of the computing device 105 that can implement the refresh manager 110 is shown in FIG. 2. In general, the refresh manager 110 monitors activities of the RF devices 125 and determines a refresh rate of the volatile memory 135 based on the monitored activities of the RF devices 125.

Generally, in terms of hardware architecture, as shown in FIG. 2, the computing device 105 includes a processor 212, memory 214, timer/counter 215, and one or more input and/or output (I/O) devices 216 (or peripherals) that are communicatively coupled via a local interface 218. The local interface 218 can be, for example but not limited to, one or more buses or other wired or wireless connections, as is known in the art. The local interface 218 may have additional elements, which are omitted for simplicity, such as controllers, buffers (caches), drivers, repeaters, and receivers, to enable communications. Further, the local interface 218 may include addresses, controls, and/or data connections to enable appropriate communications among the aforementioned components.

The processor 212 is a hardware device for executing software, particularly that stored in memory 214. The processor 212 can be any custom made or commercially available processor, a central processing unit (CPU), an auxiliary processor among several processors associated with the computing device 105, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The I/O devices 216 may include input devices, for example but not limited to, a keyboard, mouse, scanner, microphone, etc. Furthermore, the I/O devices 216 may also include output devices, for example but not limited to, a printer, display, etc. Finally, the I/O devices 216 may further include devices that communicate both inputs and outputs, for instance but not limited to, a modulator/demodulator (modem; for accessing another device, system, or network), a radio frequency (RF) device 125 or other transceiver, a telephonic interface, a bridge, a router, etc. The RF device 125 receives and transmits RF signals, such activities of which are monitored by the refresh manager 110. The refresh manager 110 can further monitor the signal strengths of the received RF signals to determine the refreshing rate of the volatile memory 135.

The memory 214 can include any one or combination of volatile memory elements 135 (e.g., random access memory (RAM, such as DRAM, SRAM, SDRAM, etc.)) and nonvolatile memory elements (e.g., ROM, hard drive, tape, CDROM, etc.). Moreover, the memory 214 may incorporate electronic, magnetic, optical, and/or other types of storage media. Note that the memory 214 can have a distributed architecture, where various components are situated remote from one another, but can be accessed by the processor 212.

The software in memory 214 may include one or more separate programs, each of which comprises an ordered listing of executable instructions for implementing logical functions. In the example of FIG. 2, the software in the memory 214 includes the refresh manager 110 and an error-rate manager 217 and a suitable operating system (O/S) 222.

The refresh manager 110 can communicate with the timer/counter 215 and/or the volatile memory 135 to determine the refresh rate of the volatile memory 135. The refresh manager 110 can refresh the volatile memory 135 by reading a row of data bits. The rate of reading the row of data bits is generally referred to as the "refresh rate" of the volatile memory. In one embodiment, the refresh manager 110 uses the timer 215 to facilitate reading the row of data bits. The timer 215 is electrically coupled to the volatile memory 135. The timer 215 includes a timer rate that determines the rate of reading the row of data bits. The refresh manager 110 determines the refresh rate by instructing the timer 215 to adjust the timer rate based on the monitored activities of the RF device 125.

In another embodiment, the volatile memory 135 includes a clock 236 and a refresh control logic 237 that controls the refresh rate of the volatile memory 135. The refresh control logic 237 is configured to adjust a clock rate that facilitates determining the refresh rate of the volatile memory. The refresh manager 110 can instruct the refresh control logic 237 to adjust the clock rate based on the monitored activities of the RF device 125.

In one embodiment, the error-rate manager 217 monitors and transmits a bit error rate of the volatile memory 135 to the refresh manager 110. The "bit error rate" (BER) generally refers to the ratio of the number of bits incorrectly received to the total number of bits sent to the volatile memory 135. Examples of bit error ratio, among others, are (a) transmission BER, which is generally referred to as the number of erroneous bits received divided by the total number of bits transmitted; and (b) information BER, which is generally referred to as the number of erroneous decoded (corrected) bits divided by the total number of decoded (corrected) bits. The refresh manager 110 determines the refresh rate of the volatile memory 135 based on the monitored bit error rate and the monitored activities of the RF device 125.

A non-exhaustive list of examples of suitable commercially available operating systems 222 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 222 essentially controls the execution of other computer programs, such as the refresh manager 110, and provides scheduling, input-output control, file and data management, memory management, and communication control and related services.

Each of the refresh manager 110 and the error-rate manager 217 is a source program, executable program (object code), script, or any other entity comprising a set of instructions to be performed. When it is a source program, then the program needs to be translated via a compiler, assembler, interpreter, or the like, which may or may not be included within the memory 214, so as to operate properly in connection with the O/S 222. Furthermore, the refresh manager 110 and the error-rate manager 217 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

If the computing device 105 is a PC, workstation, or the like, the software in the memory 214 may further include a basic input output system (BIOS) (omitted for simplicity). The BIOS is a set of essential software routines that initialize and test hardware at startup, start the O/S 222, and support the transfer of data among the hardware devices. The BIOS is stored in ROM so that the BIOS can be executed when the computing device 105 is activated.

When the computing device 105 is in operation, the processor 212 is configured to execute software stored within the memory 214, to communicate data to and from the memory 214, and to generally control operations of the computing device 105 pursuant to the software. The refresh manager 110 and the O/S 222, in whole or in part, but typically the latter, are read by the processor 212, perhaps buffered within the processor 212, and then executed.

When the refresh manager 110 and the error-rate manager 217 are implemented in software, as is shown in FIG. 2, it should be noted that the refresh manager 110 and the error-rate manager 217 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The refresh manager 110 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the refresh manager 110 and the error-rate manager 217 are implemented in hardware, the refresh manager 110 and the error-rate manager 217 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
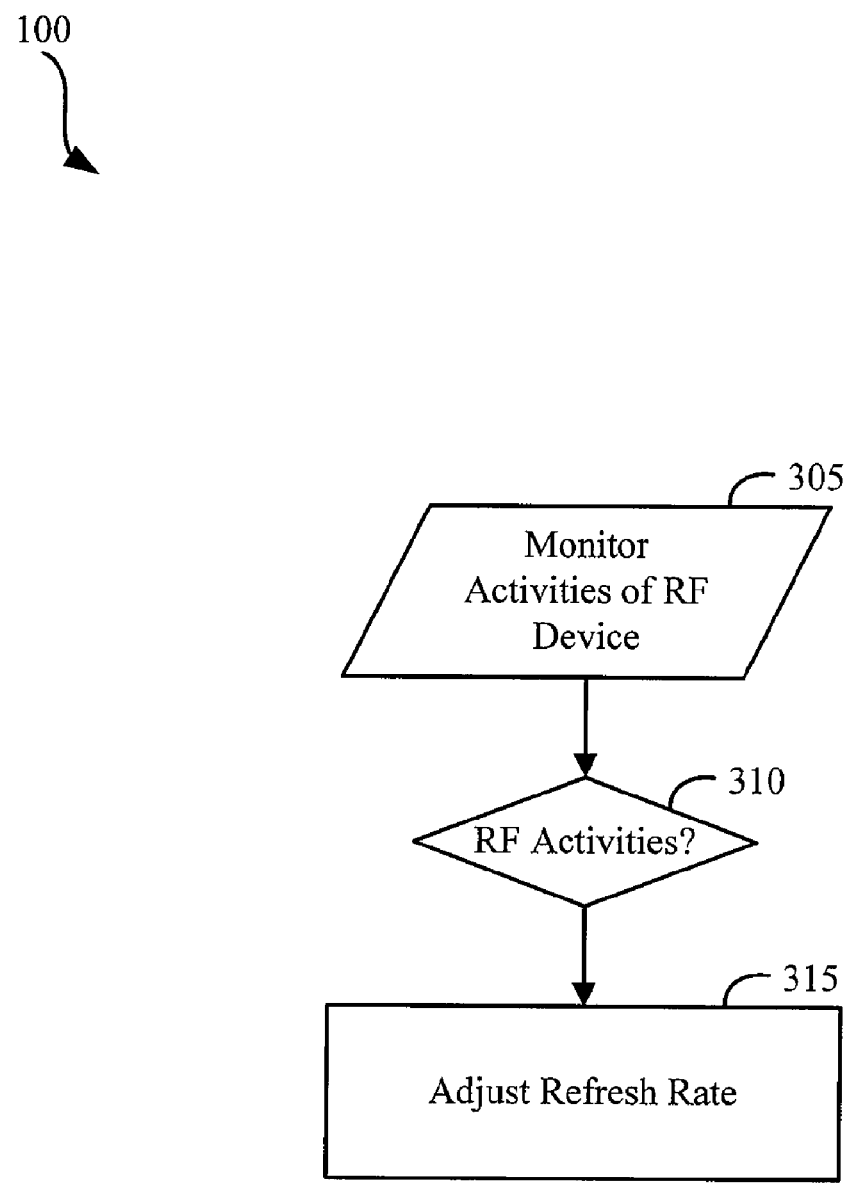
FIG. 3 is a high-level block diagram that illustrates an embodiment of the architecture, functionality, and/or operation of the refresh manager, such as that shown in FIG. 2.

FIG. 3 is a high-level block diagram that illustrates an embodiment of the architecture, functionality, and/or operation of the refresh manager 110, such as that shown in FIG. 2. Beginning with block 305, the refresh manager 110 (FIG. 2) monitors activities of a radio frequency (RF) device 125. In step 310, the refresh manager 110 determines whether to adjust a refresh rate of volatile memory 135 based on the monitored activities of the RF device 125. In step 315, responsive to determining that the refresh rate is to be adjusted, the refresh manager 110 adjusts the refresh rate of the volatile memory 135 based on the monitored activities of the RF device 125. The activities of the RF device 125 include, but are not limited to, the number of times the RF device 125 is receiving and transmitting RF signals and the signal strengths of the received RF signals.

Figure 4:
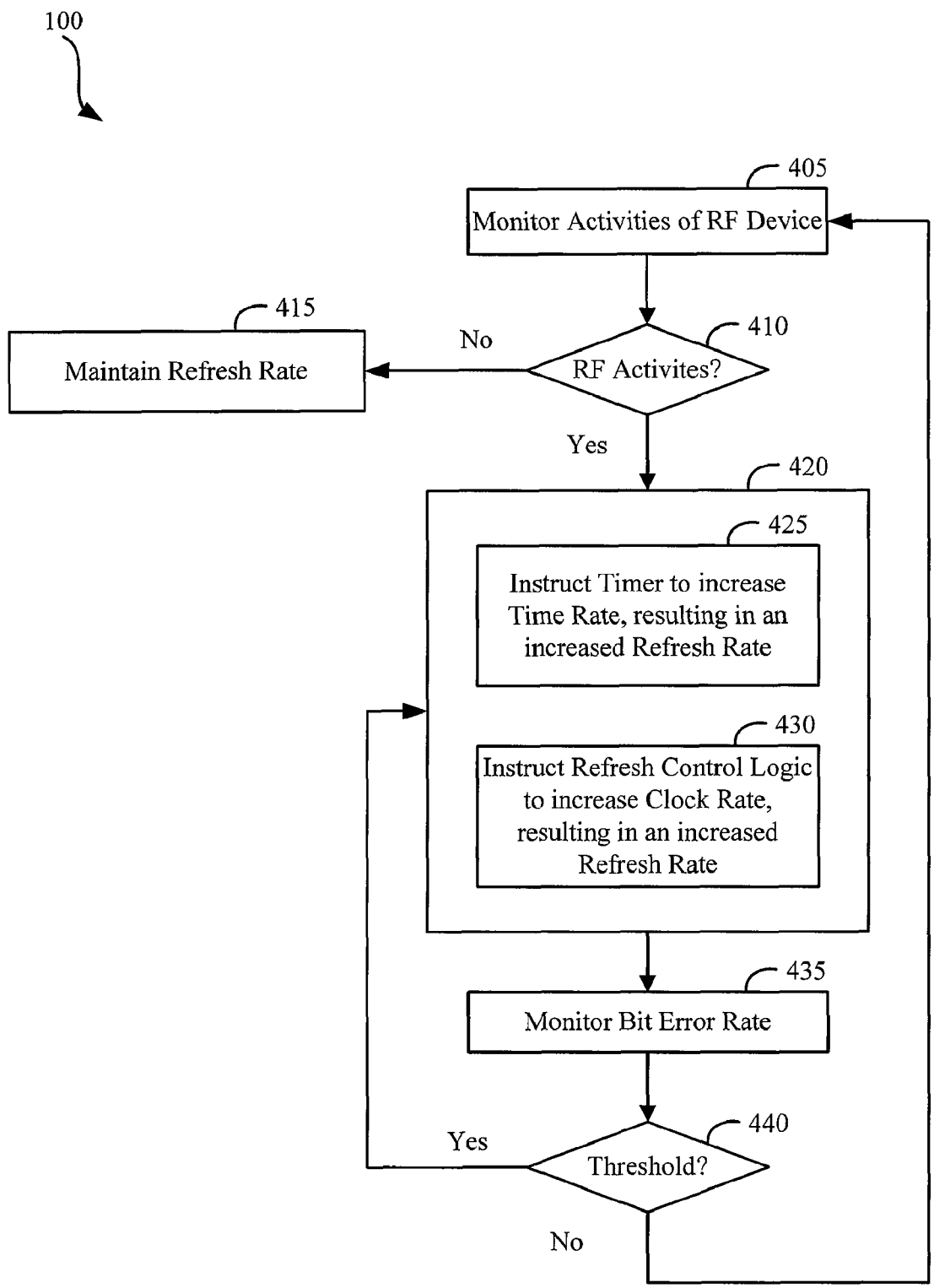
FIG. 4 is a detailed block diagram that illustrates an embodiment of the architecture, functionality, and/or operation of the refresh manager and error-rate manager, such as that shown in FIG. 2.

FIG. 4 is a detailed block diagram that illustrates an embodiment of the architecture, functionality, and/or operation of the refresh manager 110 and an error-rate manager 217, such as that shown in FIG. 2. Beginning with step 405, the refresh manager 110 monitors activities of the RF device 125. In step 410, the refresh manager 110 determines whether the monitored activities of the RF device 125 pass a threshold to adjust the refresh rate of the volatile memory 135. In step 415, responsive to determining that the activities of the RF device 125 did not pass the threshold, the refresh manager 110 maintains (or decreases) the refresh rate.

In step 420, if the monitored activities of the RF device 125 pass the threshold, the refresh manager 110 adjusts the refresh rate of the volatile memory 135. The refresh rate of the volatile memory 135 can be adjusted by decreasing and increasing the refresh rate of the volatile memory 135 based on the decreased and increased activities of the RF device 125, respectively. In one embodiment, step 425 instructs a timer 215 to increase a time rate based on the monitored activities of the RF device 125, resulting in increasing the refresh rate of the volatile memory 135. In another embodiment, step 430 instructs a refresh control logic 237 to increase a clock rate of the volatile memory 135, resulting in increasing the refresh rate of the volatile memory 135.

In another embodiment, the error-rate manager 217 monitors a bit error rate at step 435. In step 440, the error-rate manager 217 determines whether the bit error rate passes an error threshold. If the bit error rate passes the error threshold, the operation is returned to step 420, which increases the refresh rate of the volatile memory 135. Responsive to determining that the monitored bit error rate did not pass the error threshold, the operation is returned to step 405, which monitors the activities of the RF device 125.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, are suited to the particular use contemplated. All such modifications and variation are within the scope of this disclosure, as determined by the appended claims when interpreted in accordance with the breadth to which they are fairly and legally entitled.

What is claimed:

1. A system comprising:
a radio frequency (RF) device;
a computing device that communicates with the RF device, the computing device including a refresh manager that monitors activities of the RF device; and
volatile memory that communicates with the refresh manager of the computing device, wherein the refresh manager determines a refresh rate of the volatile memory based on the monitored activities of the RF device.

2. The system as defined in claim 1, wherein the RF device includes at least one of a transmitter, receiver, and transceiver.

3. The system as defined in claim 1, further comprising a wireless communication device that communicates with the RF device, the wireless communication device including at least one of a transmitter, receiver, transceiver, RF tower, and RF network router.

4. The system as defined in claim 1, wherein the volatile memory includes a random access memory (RAM), the RAM including at least one of dynamic RAM (DRAM), static RAM (SRAM), static dynamic RAM (SDRAM).

5. The system as defined in claim 1, wherein the refresh manager decreases and increases the refresh rate of the volatile memory based on the decreased and increased activities of the RF device, respectively, the activities of the RF device including at least one of the number of times the RF device is receiving and transmitting RF signals and the signal strengths of the received RF signals.

6. The system as defined in claim 1, wherein the computing device further comprises a timer that is electrically coupled to the volatile memory, the timer having a timer rate that facilitates determining the refresh rate of the volatile memory, wherein the refresh manager determines the refresh rate by instructing the timer to adjust the timer rate based on the monitored activities of the RF device.

7. The system as defined in claim 1, wherein the volatile memory comprises a clock and a refresh control logic, the refresh control logic being configured to adjust a clock rate that facilitates determining the refresh rate of the volatile memory, wherein the refresh manager determines the refresh rate by instructing the refresh control logic to adjust the clock rate based on the monitored activities of the RF device.

8. The system as defined in claim 1, wherein the computing device further comprises an error-rate manager that communicates with the refresh manager, the error-rate manager being configured to monitor and transmit a bit error rate of the volatile memory to the refresh manager, wherein the bit error rate is the ratio of the number of bits incorrectly received to the total number of bits sent to the volatile memory, wherein the refresh manager determines the refresh rate of the volatile memory based on the monitored bit error rate.

9. A method for determining a refresh rate of volatile memory, the method comprising:
monitoring activities of a radio frequency (RF) device; and
adjusting a refresh rate of volatile memory based on the monitored activities of the RF device.

10. The method as defined in claim 9, wherein monitoring the activities of the RF device comprises detecting the transmission of the RF signals.

11. The method as defined in claim 9, wherein monitoring the activities of the RF device comprises detecting the reception of the RF signals, the detection of the RF signals further includes detecting the signal strengths of the received RF signals.

12. The method as defined in claim 9, wherein adjusting the refresh rate of the volatile memory comprises decreasing and increasing the refresh rate of the volatile memory based on the decreased and increased activities of the RF device, respectively, the activities of the RF device including at least one of the number of times the RF device is receiving and transmitting RF signals and the signal strengths of the received RF signals.

13. The method as defined in claim 9, wherein adjusting the refresh rate of the volatile memory comprises instructing a timer to adjust a timer rate based on the monitored activities of the RF device, the timer being configured to be electrically coupled to the volatile memory, wherein the timer facilitates determining the refresh rate of the volatile memory.

14. The method as defined in claim 9, wherein adjusting the refresh rate of the volatile memory comprises instructing a refresh control logic of the volatile memory to adjust a clock rate based on the monitored activities of the RF device, wherein the refresh control logic facilitates determining the refresh rate of the volatile memory.

15. The method as defined in claim 9, further comprising:
monitoring an bit error rate;
determining whether to adjust the refresh rate of volatile memory based on the monitored bit error rate; and
responsive to determining that the refresh rate is to be adjusted, adjusting the refresh rate of the volatile memory based on the monitored bit error rate.

16. A computing device comprising:
a radio frequency (RF) device;
a refresh manager that monitors activities of the RF device; and
volatile memory that communicates with the refresh manager, wherein the refresh manager determines the refresh rate of the volatile memory based on the monitored activities of the RF device.

17. The computing device as defined in claim 16, wherein the refresh manager decreases and increases the refresh rate of the volatile memory based on the decreased and increased activities of the RF device, respectively, the activities of the RF device including at least one of the number of times the RF device is receiving and transmitting RF signals and the signal strengths of the received RF signals.

18. The computing device as defined in claim 16, further comprising a timer that is electrically coupled to the volatile memory, the timer having a timer rate that facilitates determining the refresh rate of the volatile memory, wherein the refresh manager determines the refresh rate by instructing the timer to adjust the timer rate based on the monitored activities of the RF device.

19. The computing device as defined in claim 16, wherein the volatile memory comprises a clock and a refresh control logic, the refresh control logic being configured to adjust a clock rate that facilitates determining the refresh rate of the volatile memory, wherein the refresh manager determines the refresh rate by instructing the refresh control logic to adjust the clock rate based on the monitored activities of the RF device.

20. The computing device as defined in claim 16, further comprising an error-rate manager that communicates with the refresh manager, the error-rate manager being configured to monitor and transmit the bit error rate of the volatile memory to the refresh manager, wherein the bit error rate is the ratio of the number of bits incorrectly received to the total number of bits sent to the volatile memory, wherein the refresh manager determines the refresh rate of the volatile memory based on the monitored bit error rate.

* * * * *